(12) United States Patent
Iwamoto et al.

(10) Patent No.: US 9,070,922 B2
(45) Date of Patent: Jun. 30, 2015

(54) ELECTRONIC DEVICE

(71) Applicant: Panasonic Corporation, Osaka (JP)

(72) Inventors: Akira Iwamoto, Osaka (JP); Tadashi Matsunobe, Osaka (JP); Masaru Furujiku, Osaka (JP); Jun Satoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 196 days.

(21) Appl. No.: 13/954,196

(22) Filed: Jul. 30, 2013

(65) Prior Publication Data

US 2014/0177174 A1  Jun. 26, 2014

(30) Foreign Application Priority Data

Dec. 26, 2012  (JP) .................................. 2012-282825

(51) Int. Cl.
*G06F 1/16* (2006.01)
*H01M 2/10* (2006.01)

(52) U.S. Cl.
CPC ........................................ *H01M 2/10* (2013.01)

(58) Field of Classification Search
USPC ......... 429/179, 100, 99, 7, 178, 123, 176, 50,
429/91, 156; 361/679.58, 679.08, 679.01,
361/679.55, 679.3, 679.02, 679.21, 679.33,
361/679.4, 679.04, 679.28, 679.46, 679.09,
361/679.17; 455/550.1, 575.8, 575.4,
455/575.1, 572, 575.3, 41.3, 569.1;
439/527, 218, 587; 248/316.7, 917,
248/226.11; 320/106, 107, 100, 114, 109,
320/112, 108; 312/42, 223.1, 237, 326;
345/156, 173, 619, 629

See application file for complete search history.

(56) References Cited

U.S. PATENT DOCUMENTS

| 2010/0035133 A1* | 2/2010 | Wang ............................ 429/100 |
| 2010/0091455 A1* | 4/2010 | Tang ........................ 361/679.58 |
| 2014/0038033 A1* | 2/2014 | Takeshita et al. ............. 429/179 |

FOREIGN PATENT DOCUMENTS

JP  5-006679 U  1/1993

* cited by examiner

*Primary Examiner* — Hung Duong
(74) *Attorney, Agent, or Firm* — Hamre, Schumann, Mueller & Larson, P.C

(57) ABSTRACT

There is provided an electronic device includes a lock member disposed at a part of a peripheral wall of a battery pack loading section so as to be freely shift between a lock position for locking a loaded battery pack and an unlock position for releasing the lock; an unlock restricting member provided so as to be freely shift between a restriction position for restricting the lock member from being shifted to the unlock position and a non-restriction position for releasing the restriction; and a restricting member abutting portion provided at the outer surface of the battery pack, for abutting against the unlock restricting member to shift the unlock restricting member to the non-restriction position, when the unlock restricting member is located at the restriction position even though no battery pack is loaded in the battery pack loading section.

5 Claims, 7 Drawing Sheets

ELECTRONIC DEVICE

BACKGROUND OF THE INVENTION

1. Field of the Invention

The present disclosure relates to an electronic device and, more particularly, to an electronic device equipped with a detachable battery.

2. Description of the Related Art

As well known, an electronic device such as a personal computer and an information terminal device, in particular, a portable electronic device such as a so-called tablet type or a notebook type computer and a tablet type mobile information terminal is generally used in the state in which a detachable battery is loaded at a battery loading section in a device casing.

As a mechanism for loading a battery in the battery loading section in the device casing, for example, a configuration in which a lock member (restraining member) is disposed in the battery loading section and a lock engagement part which engages with the lock member is disposed at an outer surface of the battery case has been generally well known. In the above mechanism, when the battery is loaded, the lock member engages with the lock engagement part, thereby, the battery is securely locked to the battery loading section.

In this case, there has been also known a structure in which if the battery is loaded into the battery loading section in a state in which the lock member is located at a lock position, the lock member is shifted to an unlock (release) position in association with the battery loading operation, and further, the lock member is automatically returned to the lock position by the restoring function by urging force of urging means upon the completion of the battery loading operation.

Japanese Utility Model Laid-open Publication No. 5-006679, for example, discloses a configuration in which a plurality of (two) lock members are disposed in a battery loading section, thereby requiring unlocking operations at different timings during unlocking. The adoption of the above-described configuration can achieve a so-called dual lock mechanism. Therefore, it is possible to suppress a loaded battery from readily falling even at the time of exertion of an impact force such as falling of the electronic device.

SUMMARY OF THE DISCLOSURE

However, in the electronic device provided with the battery loading section having the dual lock mechanism, if a user intends to loading a battery in the battery loading section in, for example, an erroneous dual locked state even though no battery is loaded in the battery loading section, the battery interferes with the lock member. And, if the user forcedly continues to perform the battery loading operation without realizing the interference, there is a possibility that damage may be exerted on the lock member.

To cope therewith, One non-limiting and exemplary embodiment provides an electronic device capable of loading a battery without exerting a damage on a lock member in a dual locked state even though no battery is loaded in a battery loading section, in an electronic device provided with the battery loading section having a dual lock mechanism.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to one general aspect of the present disclosure, there is provided an electronic device including: a detachable battery from a casing; a battery loading section in which the battery is loaded, the battery loading section having a receiving surface that receives a battery to be mounted thereon and a peripheral wall that is formed at a peripheral edge of the receiving surface and faces side surfaces of the battery; a lock member disposed at a part of the peripheral wall and configured to shift between a lock position at which the loaded battery is locked to the battery loading section and an unlock position at which the lock is released; an unlock restricting member configured to shift between a restriction position at which the lock member at the lock position is restricted from being shifted to the unlock position and a non-restriction position at which the restriction is released; and a restricting member abutting portion provided at the outer surface of the battery and configured to abut against the unlock restricting member to shift the unlock restricting member to the non-restriction position when the battery being loaded into the battery loading section, in a case where the unlock restricting member is located at the restriction position even though no battery is loaded in the battery loading section.

With the electronic device according to the present disclosure, the lock member and the unlock restricting member can achieve the dual lock mechanism. Even at the time of exertion of an impact such as the falling-down of the electronic device, it is possible to suppress the loaded battery from readily falling down. In addition, when the unlock restricting member is located at a restriction position (i.e., the battery is dually locked) even though no battery is loaded in the battery loading section, the restricting member abutting portion formed at the outer surface of the battery abuts against the unlock restricting member to shift the unlock restricting member to the non-restriction position upon the battery being loaded into the battery loading section, whereby the battery can be loaded without inducing any damage on the lock member.

DETAILED DESCRIPTION

Figure 1:
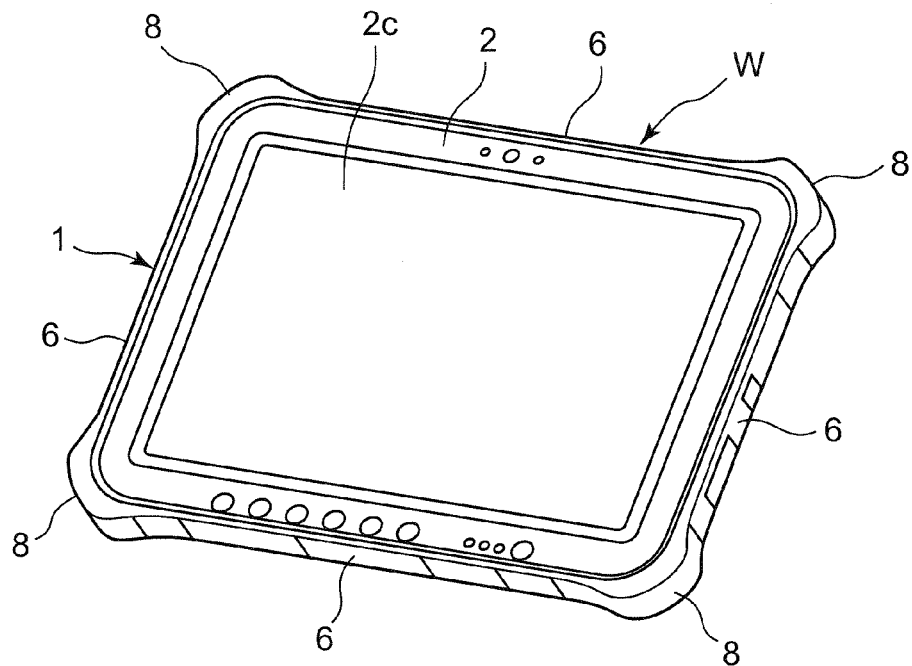
FIG. 1 is a perspective view illustrating a tablet terminal device on a display screen side according to an embodiment of the present disclosure.

An electronic device according to the present disclosure can be embodied in aspects below in addition to the aforementioned basic structure. Specifically, the electronic device may further includes: an urging member configured to urge the lock member toward the lock position; and a lock member abutting portion provided at the outer surface of the battery and configured to abut against the lock member located at the lock position to shift the lock member to the unlock position against the urging force of the urging member when the battery being loaded into the battery loading section.

With this structure, when the battery is loaded into the battery loading section, the lock member abutting portion formed at the outer surface of the battery abuts against the lock member located at the lock position to shift the lock member to the unlock position against the urging force of the urging member. Therefore, the battery can be loaded into the battery loading section without any problem. Additionally, after the battery is loaded, the lock member is automatically moved toward the lock position by the effect of the urging member. Thus, the loaded battery can be kept in the locked state.

Further, in the aforementioned case, the lock member abutting portion may abut against the lock member located at the lock position to shift the lock member to the unlock position, after the restricting member abutting portion abuts against the unlock restricting member at the restriction position to shift the unlock restricting member to the non-restriction position, when the battery being loaded into the battery loading section, in a case where the unlock restricting member is located at the restriction position even though no battery is loaded in the battery loading section.

With this structure, in a case where the unlock restricting member is located at the restriction position even though no battery is loaded in the battery loading section, the lock member is shifted to the unlock position after the unlock restricting member is shifted to the non-restriction position upon the battery being loaded into the battery loading section. Therefore, it is possible to effectively prevent the lock member from being damaged so as to smoothly dispose the battery.

Further, a tip of the unlock restricting member may form into a horn projecting from the peripheral wall inward of the battery loading section, and a component of a pressing force generated by the abutment of the restricting member abutting portion against the horn may exert in a direction perpendicular to the peripheral wall.

With this structure, since the restricting member abutting portion abuts against the horn (i.e., the tip of the unlock restricting member) to produce the pressing force, a component of the force exerts in a direction perpendicular to the peripheral wall, the horn projecting inward of the battery loaded unit when the unlock restricting member is located at the restriction position can be shifted outward of the battery loading section (that is to say, toward the non-restriction position).

Moreover, the electronic device may further include: a first lock tab for operating the lock member in a longitudinal direction along a peripheral wall of the battery pack loading section; a second lock tab for operating the unlock restricting member in a lateral direction perpendicular to the longitudinal direction; a longitudinal groove, in which the first lock tab and the second lock tab are moved to the lock position and the unlock position in the longitudinal direction when the lock member is shifted between the lock position and the unlock position; and a lateral groove connected to the longitudinal groove, in which the second lock tab is moved from the non-restriction position that is referred to as the lock position to the restriction position in the lateral direction when the unlock restricting member is shifted between the restriction position and the non-restriction position.

With this structure, the longitudinal groove and the lateral groove are formed, so that the first lock tab and the second lock tab can be moved in required directions, respectively. Consequently, the lock member can be shifted between the lock position and the unlock position, and further, the unlock restricting member can be shifted between the restriction position and the non-restriction position.

Embodiments

Hereinafter, an embodiment will be described in detail with reference to the drawings, appropriately. However, descriptions in detail more than necessary may be omitted. For example, matters which have been already well known may not be described in detail, and substantially the same configurations may not be described redundantly. This is for avoiding the following descriptions from being unnecessarily redundant and for allowing those skilled in the art to easily understand them.

Further, the present inventor(s) gives the accompanying drawings and the following descriptions for allowing those skilled in the art to sufficiently understand the present disclosure, and the main theme defined in the claims is not intended to be restricted thereby.

Further, in the following description, terms which denote certain directions (such as "upper", "lower", "left", "right" and other terms including these terms, "clockwise", "counterclockwise") may be used, but the use of them is merely for ease of understanding of the disclosure with reference to the drawings, and the present disclosure should not be restrictively understood by the meanings of these terms.

The embodiment of the present disclosure which will be described later is an example where the present disclosure is applied to a so-called tablet type portable information terminal device (hereinafter, appropriately referred to as a "tablet terminal device" or simply referred to as a "device").

Figure 2:
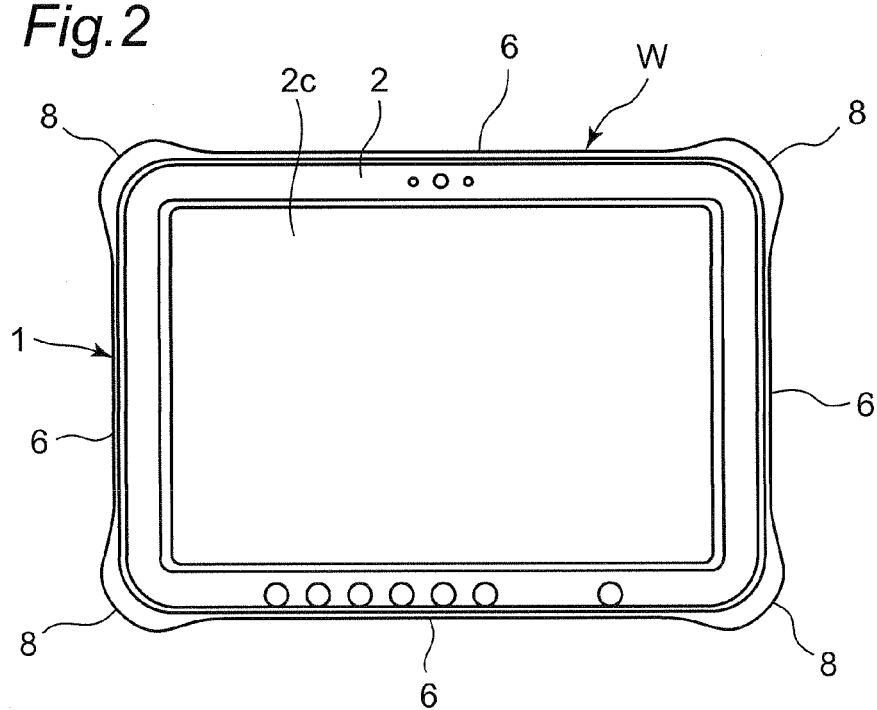
FIG. 2 is a plan view illustrating the tablet terminal device.
Figure 3:
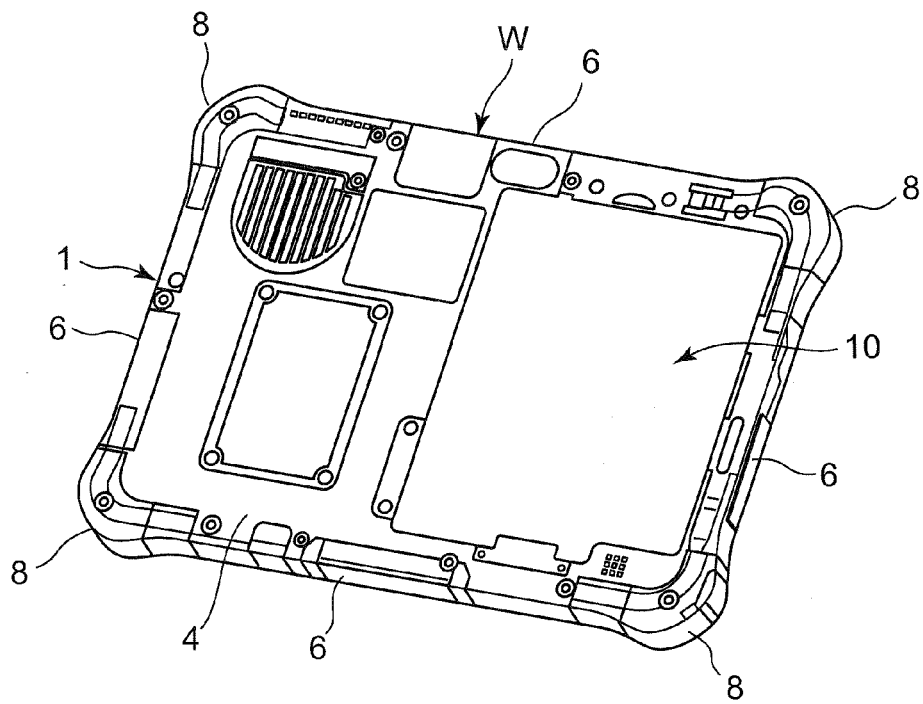
FIG. 3 is a perspective view illustrating the tablet terminal device on a back side.
Figure 4:
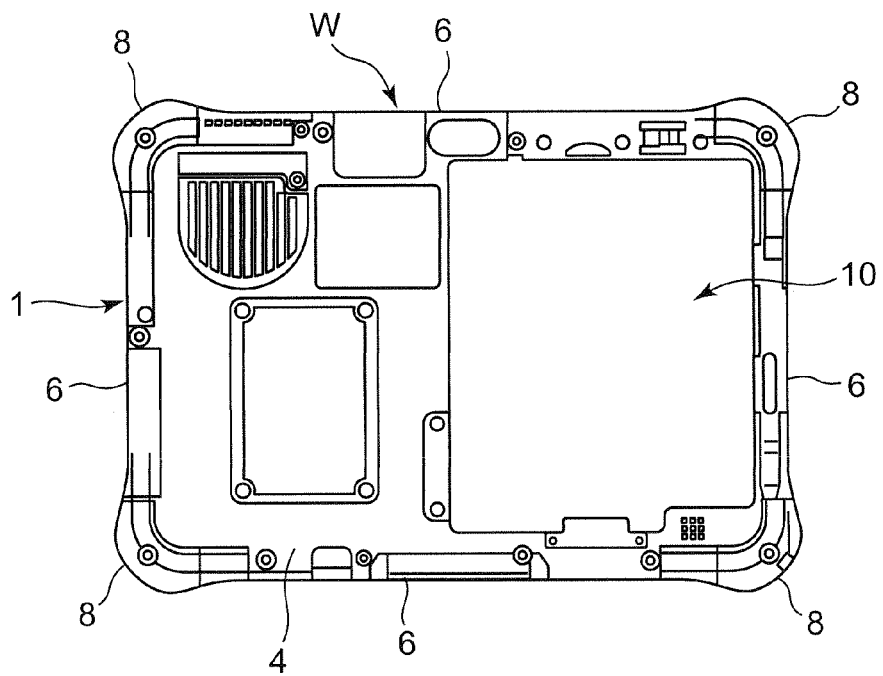
FIG. 4 is a rear view illustrating the tablet terminal device.

FIG. 1 and FIG. 2 are a perspective view and a plan view illustrating a tablet terminal device as the electronic device on a display screen side according to the present embodiment, respectively. Moreover, FIG. 3 and FIG. 4 are a perspective view and a plan view illustrating the tablet terminal device on the back side, respectively.

As illustrated in FIG. 1 to FIG. 4, a tablet terminal device W according to the present embodiment includes a casing 1 that is formed into a substantially quadrangular shape, as viewed on a plane, and has a predetermined thickness (i.e., a predetermined height). The casing 1 has, as its outer surface, an upper surface 2 and a lower surface 4 that are vertically disposed opposite to each other and a side surface 6 for connecting the peripheral edges of the surfaces 2 and 4 to each other. The side surfaces 6 are configured to have two pairs of substantially flat surfaces disposed opposite to each other as essential surfaces.

In the present embodiment, a bulge portion 8 bulging outward of the casing 1 in a curved manner is formed at each of corners of the casing 1, in order to enhance shock resistance when the device W falls down. Essential parts of the casing 1 are made of a metallic material such as magnesium (Mg) so as to secure mechanical rigidity or the like. The four bulge portions 8 are made of a material having a higher elasticity than that of the material of the casing 1, for example, an elastomer. These bulge portions 8 are attached to the corners of the Mg casing 1, and thus, are fixed to the casing 1.

The size and weight of the tablet terminal device W are set so as to ensure the portability thereof. A display screen 2c made of, for example, a liquid crystal is disposed at the upper surface 2 of the casing 1. The display screen 2c is also used as an input screen of a touch panel type. In the meantime, a battery pack 10 serving as a mobile power source is loaded at the lower surface 4 (i.e., a back side) of the casing 1. The battery pack 10 has a predetermined thickness and is formed into a substantially quadrangular shape, as viewed on a plane.

Figure 5:
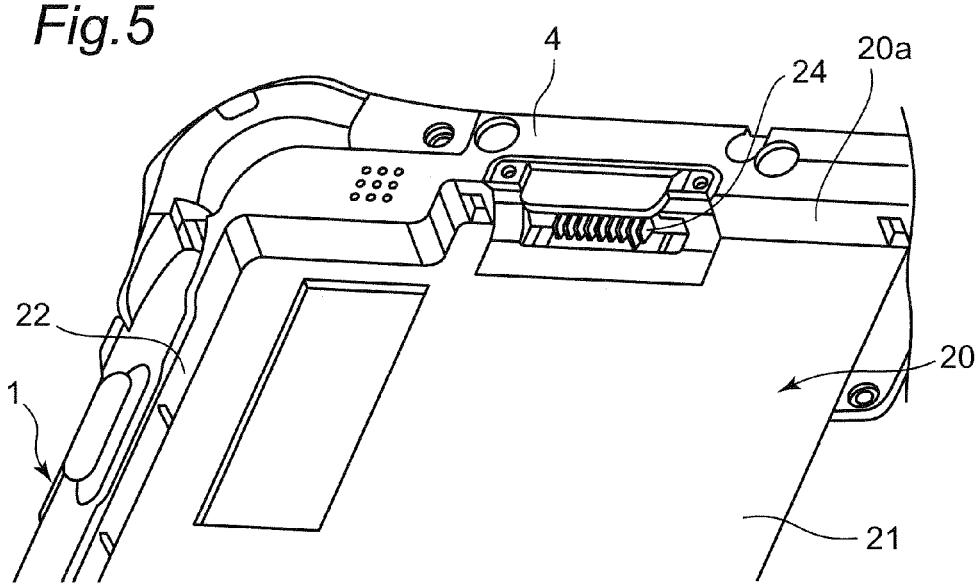
FIG. 5 is a perspective view illustrating a battery pack loading section in the tablet terminal device.
Figure 6:
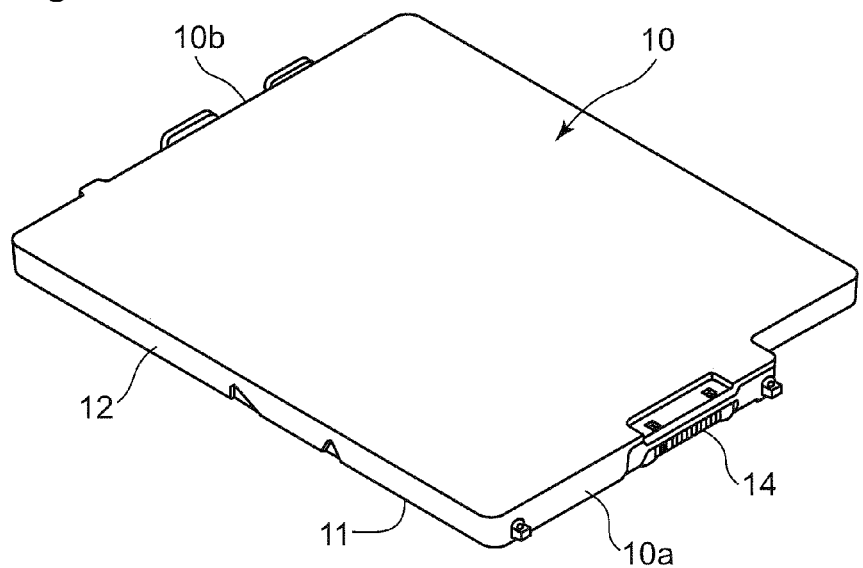
FIG. 6 is a perspective view illustrating a battery pack.
Figure 7:
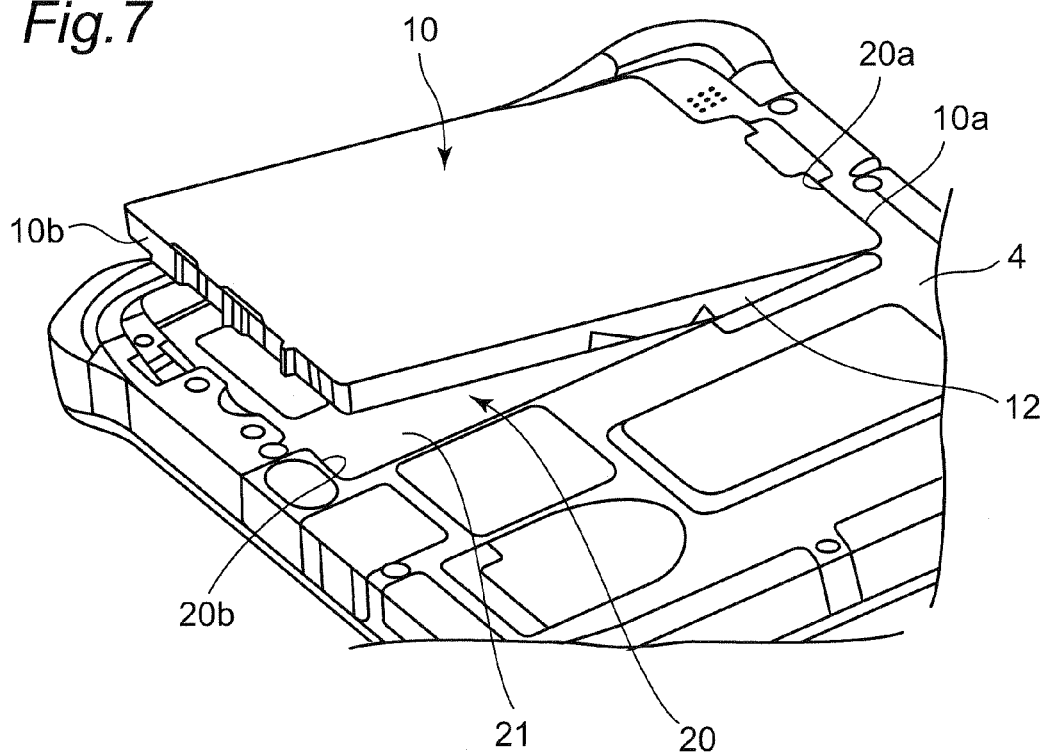
FIG. 7 is a perspective view explaining an operation for loading or unloading a battery pack to or from the battery pack loading section.
Figure 8:
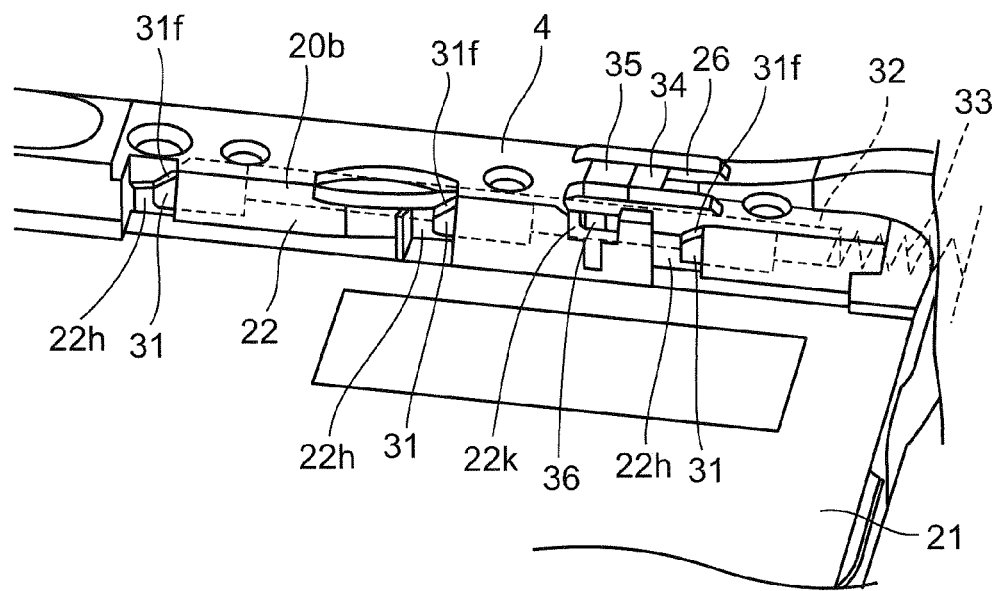
FIG. 8 is an enlarged perspective view illustrating essential parts of the battery pack loading section.
Figure 9:
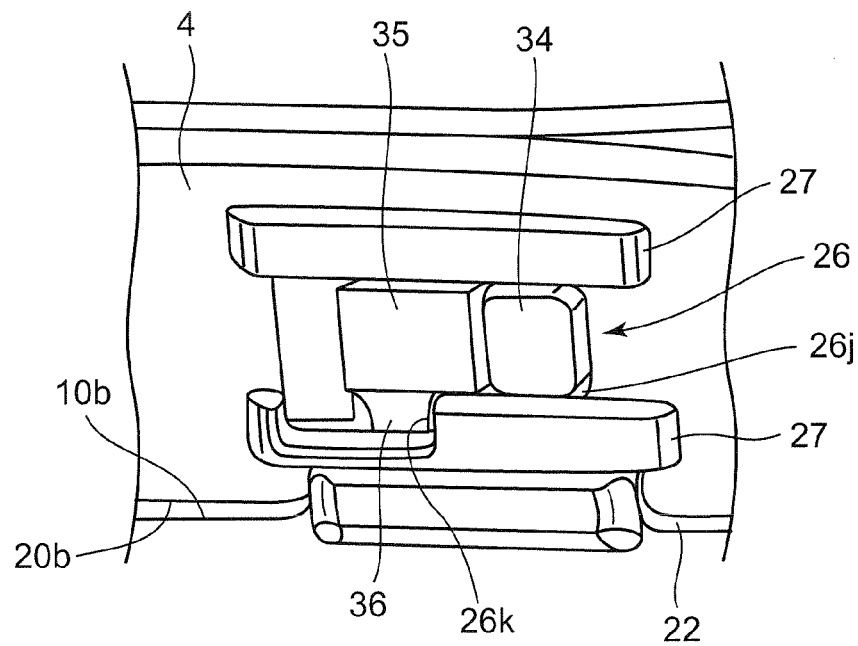
FIG. 9 is one of a series of enlarged perspective views illustrating a lock tab in the battery pack loading section.
Figure 10:
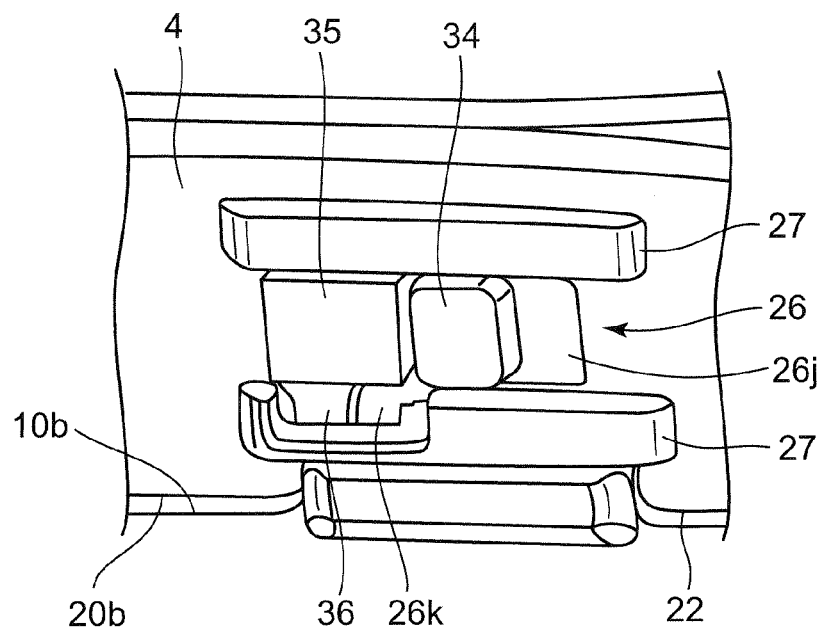
FIG. 10 is another one of the series of enlarged perspective views illustrating the lock tab in the battery pack loading section.

FIG. 5 is a perspective view explaining an operation for loading or unloading the battery pack to or from a battery pack loading section 20 of the casing 1, as viewed on the back side; and FIG. 6 is a perspective view illustrating the battery pack loading section 20. Moreover, FIG. 7 and FIG. 8 are perspective views illustrating the battery pack 10 on the back side and the mount surface side, respectively. FIG. 9 is a perspective view illustrating the battery pack 10 on the mount surface side, as viewed in a direction different from that of FIG. 8. Furthermore, FIG. 10 is an enlarged perspective view illustrating a battery terminal of the battery pack 10 and its surroundings.

As is obvious from FIG. 6, the battery pack loading section 20 provided at the lower surface 4 (i.e., the back side) of the casing 1 has a battery receiving surface 21 that receives a mount surface 11 of the battery pack 10 and a peripheral wall 22 that is formed at the peripheral edge of the battery receiving surface 21 so as to face a side surface 12 of the battery pack 10. The shape and height of the peripheral wall 22 are set so as to contain the battery pack 10 therein without any looseness.

On one side 20a of the battery pack loading section 20 is formed a connector 24 to be connected to a battery terminal 14 (see, for example, FIG. 7) on one side 10a of the battery pack 10. The battery pack 10 can be loaded to or unloaded from the battery pack loading section 20. When the battery pack 10 is loaded in the battery pack loading section 20, the battery terminal 14 of the battery pack 10 is positioned at the connector 24 of the battery pack loading section 20, as shown in FIG. 5, and then, the entire battery pack 10 is kept slantwise in the state in which the other side 10b opposite to the one side 10a of the battery pack 10 and its vicinity are held while the entire battery pack 10 is tilted so as to gradually reduce the inclination angle, and thus, the battery pack 10 is contained on the side 10b thereof inside of the battery pack loading section 20 on the peripheral wall 22 on the other side 20b.

As shown in FIG. 8 in enlargement, in the present embodiment, a claw-like lock member 31 for locking the loaded battery pack 10 to the battery pack loading section 20 is disposed on the peripheral wall 22 on the other side 20b of the battery pack loading section 20. The lock member 31 is provided so as to freely project or retreat in a recess 22h formed on the peripheral wall 22. When the lock member 31 projects inside of the recess 22h, the loaded battery pack 10 is locked to the battery pack loading section 20. In contrast, when the battery pack 10 retreats from the recess 22h, the locked battery pack 10 is unlocked from the battery pack loading section 20. In this manner, the lock member 31 is provided so as to shift between a lock position at which the loaded battery pack 10 is locked to the battery pack loading section 20 and an unlock position at which the lock is unlocked.

A plurality of (for example, three in the present embodiment) lock members 31 are provided. These lock members 31 are connected to, for example, a single slide member 32. The slide member 32 is provided in the peripheral wall 22 on the other side 20b of the battery pack loading section 20 so as to freely slide along the peripheral wall 22. At one end of the slide member 32, a coil spring 33 serving as an urging member for urging the slide member 32 (i.e., the lock members 31) in a lock direction (i.e., leftward in FIG. 6) is attached. With the function of the coil spring 33, the lock members 31 project inside of the recesses 22h formed on the peripheral wall 22 during a normal time at which the lock members 31 are not pushed in an unlock direction (i.e., rightward in FIG. 6).

A lock tab 34 (i.e., a first lock tab) is formed integrally with the slide member 32. The first lock tab 34 is disposed in a tab groove 26 provided in the vicinity of the peripheral wall 22 at the lower surface 4 of the casing 1, and slides in the tab groove 26 along the peripheral wall 22 in association with the slide motion of the slide member 32.

Figure 11:
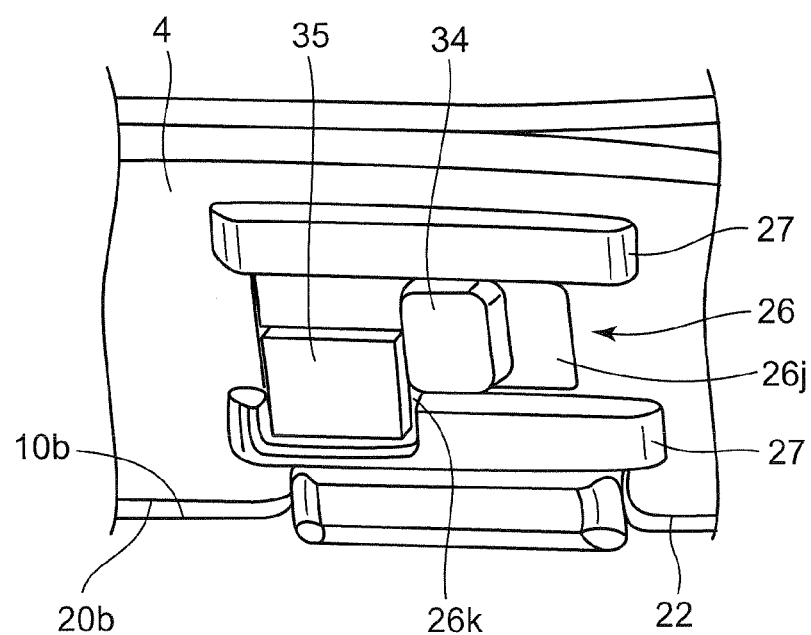
FIG. 11 is a further one of the series of enlarger perspective views illustrating the lock tab in the battery pack loading section.
Figure 12:
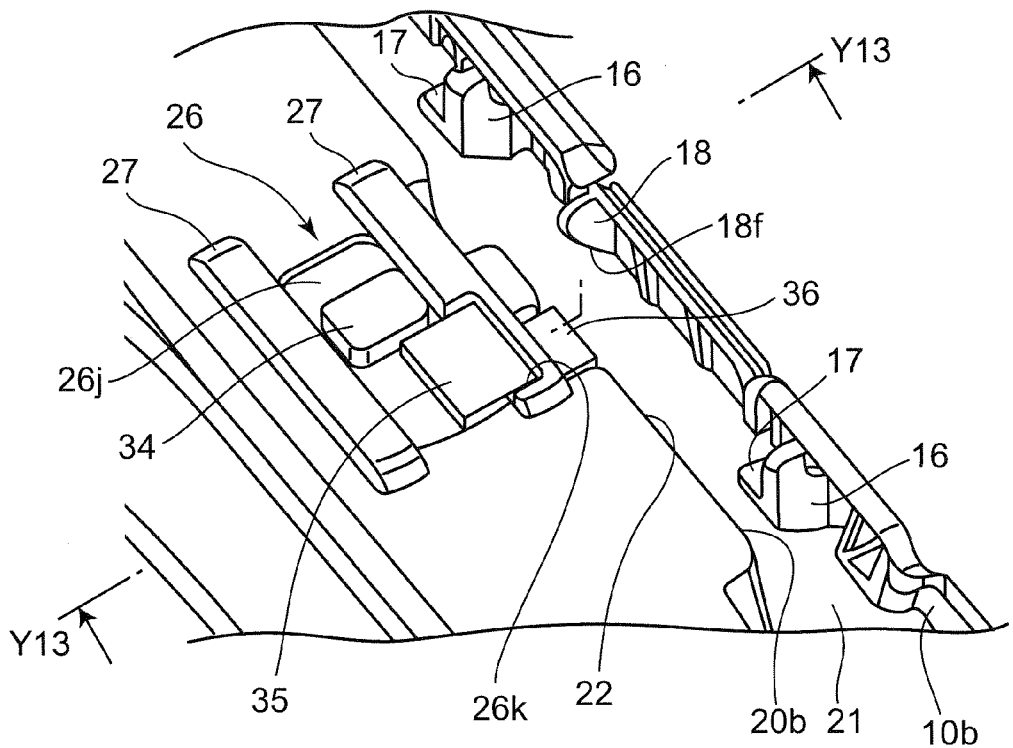
FIG. 12 is an enlarged perspective view illustrating essential parts of the lock tab and the battery pack in order to explain an operation for loading the battery pack.
Figure 13:
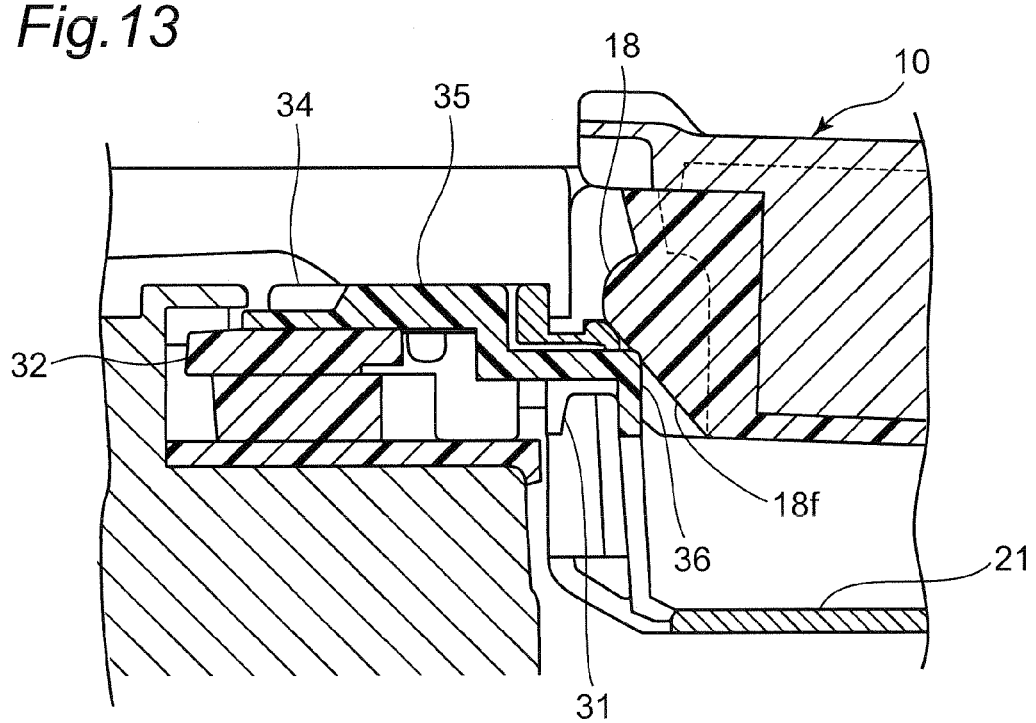
FIG. 13 is a vertical cross-sectional view taken along a line Y13-Y13 in FIG. 12.

FIGS. 9 to 11 are a series of enlarged perspective views illustrating the lock tab and the tab groove. FIG. 12 is an enlarged perspective view illustrating essential parts of the lock tab, the tab groove, and the battery pack 10 in order to explain an operation for loading the battery pack 10. FIG. 13 is a vertical cross-sectional view taken along a line Y13-Y13 in FIG. 12.

As shown in FIGS. 9 to 13, the tab groove 26 is formed between a couple of projecting parallel guides 27 extending along the peripheral wall 22. The sliding motion of the first lock tab 34 is guided between the projecting guides 27. Here, a second lock tab 35, described later, also is disposed in the tab groove 26. The tab groove 26 includes a longitudinal groove 26j extending along the peripheral wall 22 and a lateral groove 26k branched in a direction perpendicular to the longitudinal groove 26j (i.e., a direction perpendicular to the peripheral wall 22). In addition, an opening 22k for allowing the lateral groove 26k and the battery pack loading section 20 to communicate with each other is formed on the peripheral wall 22 at a portion facing the lateral groove 26k.

In the present embodiment, there is provided an unlock restricting member 36 for restricting the lock member 31 from being accidentally shifted to the unlock position from the lock position, and then, from being unlocked in the case where, for example, the tablet terminal device W falls down to thus receive an impact. The unlock restricting member 36 is formed integrally with the second lock tab 35. When the user manually moves the second lock tab 35 into the lateral groove 26k so that the unlock restricting member 36 reaches a restriction position at which the unlock restricting member 36 projects from the opening 22k formed on the peripheral wall 22, the shift of the second lock tab 35 and the unlock restricting member 36 along the peripheral wall 22 becomes impossible. In association with this, the shift of the first lock tab 34 and the lock members 31 along the peripheral wall 22 becomes impossible. Then, the user manually moves the second lock tab 35 from the lateral groove 26k into the longitudinal groove 26j, the unlock restricting member 36 is retreated from the opening 22k formed on the peripheral wall 22 and reaches to a non-restriction position. In this manner, the unlock restricting member 36 can be shifted between the restriction position at which each the lock member 31 at the lock position is restricted from being shifted to the unlock position and the non-restriction position at which the restriction is released.

FIG. 9 shows the positions of the first and second lock tabs 34 and 35 in the tab groove 26 when each the lock member 31 is located at the unlock position. This state is referred to as that the lock tabs 34 and 35 are located at the unlock position. FIG. 10 shows the positions of the first and second lock tabs 34 and 35 in the tab groove 26 when each the lock member 31 is located at the lock position. This state is referred to as that the lock tabs 34 and 35 are located at the lock position. This state is also referred to as that the lock tab 35 is located at the non-restriction position. Further, FIG. 11 shows the positions of the first and second lock tabs 34 and 35 in the tab groove 26 when each the lock member 31 is located at the lock position and the unlock restricting member 36 is located at the restriction position. This state is referred to as that the lock tab 35 is located at the restriction position.

As shown in FIGS. 9 and 10, in the state in which the first and second lock tabs 34 and 35 are aligned with each other, the lock tabs 34 and 35 can be shifted along the peripheral wall 22 in the longitudinal groove 26j of the tab groove 26. In the meantime, as shown in FIG. 11, in the state in which each the lock member 31 is at the lock position and the second lock tab 35 is contained in the lateral groove 26k (i.e., the unlock restricting member 36 is located at the restriction position), the lock member 31 in the lock position is restricted from being shifted to the unlock position.

As shown in FIGS. 12 and 13, at the outer surface on the other side 10b of the battery pack 10, an abutting portion 16 (i.e., a first abutting portion) is provided. The first abutting portion is to abut against the lock member 31 located at the lock position and shifts the lock member 31 to the unlock position against the urging force of the coil spring 33 when the other side 10b of the battery pack 10 is contained in the peripheral wall 22 on the other side 20b of the battery pack loading section 20. When the battery pack 10 is loaded, the first abutting portion 16 abuts against an inclined surface 31f (see FIG. 8) of the lock member 31 located at the lock position, so that a component of the pressing force applied by the first abutting portion 16 exerts in a direction along the peripheral wall 22, thereby shifting the lock member 31 to the unlock position against the urging force of the coil spring 33 (see FIG. 9). Upon completion of loading the battery pack 10, the lock member 31 is shifted to the lock position by the urging force of the coil spring 33. Then, each the lock member 31 engages with the engagement portion 17 provided onto the side of the first abutting portion 16, so that the battery pack 10 is locked in the battery pack loading section 20. Here, the first abutting portion 16 corresponds to a "lock member abutting portion" in the present disclosure.

In the present embodiment, at the outer surface on the side 10b of the battery pack 10, an abutting portion 18 (i.e., a second abutting portion) is formed. The second abutting portion is to abut against the unlock restricting member 36 to shift the unlock restricting member 36 to the non-restriction position when the battery pack 10 is loaded into the battery pack loading section 20 in a case where the unlock restricting member 36 is located at the restriction position even though no battery pack 10 is loaded in the battery pack loading section 20. When the battery pack 10 is loaded into the battery pack loading section 20 in the case the unlock restricting member 36 is located at the restriction position even though no battery pack 10 is loaded in the battery pack loading section 20, an inclined surface 18f (see FIGS. 12 and 13) of the second abutting portion 18 abuts against, for example, the horn of the unlock restricting member 36 at the restriction position upon the battery pack 10 being loaded into the battery pack loading section 20, so that a component of a pressing force by the second abutting portion 18 exerts in a direction perpendicular to the peripheral wall 22, thereby shifting the unlock restricting member 36 to the non-restriction position (see FIG. 10). The second abutting portion 18 corresponds to a "restricting member abutting portion" in the present disclosure.

In this case, the positions, shapes, and dimensional relationships between the relevant constituent elements are set such that the unlock restricting member 36 is shifted to the non-restriction position in abutment of the second abutting portion 18 against the unlock restricting member 36 located at the restriction position, and thereafter, the lock member 31 is shifted to the unlock position in abutment of the first abutting portion 16 against the lock member 31 at the lock position.

As described above, in the present embodiment, the lock member 31 and the unlock restricting member 36 can achieve the dual lock mechanism. Therefore, if, for example, the tablet terminal device W falls down, it is possible to suppress the loaded battery pack 10 from readily falling down even at the time of the exertion of the impact. In addition, when the battery pack 10 is loaded into the battery pack loading section 20, in the case where the unlock restricting member 36 is located at the restriction position (that is to say, a dual locked state) even though no battery pack 10 is loaded in the battery pack loading section 20, the second abutting portion 18 disposed at the outer surface of the battery pack 10 abuts against the unlock restricting member 36 so as to shift the unlock restricting member 36 to the non-restriction position, whereby the battery pack 10 can be loaded without any damage on the lock member 31.

In this case, when the battery pack 10 is loaded into the battery pack loading section 20, the first abutting portion 16 disposed at the outer surface of the battery pack 10 abuts against the lock member 31 located at the lock position, and then, shifts the lock member 31 to the unlock position against the urging force of the coil spring 33. Consequently, it is possible to load the battery pack 10 into the battery pack loading section 20 without any problem, and further, automatically move the lock member 31 toward the lock position by the function of the coil spring 33 after the battery pack 10 is loaded. Thus the loaded battery pack 10 is kept in the locked state.

Moreover, in particular, when the battery pack 10 is loaded into the battery pack loading section 20 in the case where the unlock restricting member 36 is located at the restriction position even though no battery pack 10 is loaded in the battery pack loading section 20, the lock member 31 is shifted to the unlock position after the unlock restricting member 36 is shifted to the non-restriction position. Therefore, it is possible to effectively prevent damage from being caused to the lock member 31, and, to smoothly load the battery pack 10.

As described above, the present embodiment has been described as an example of the technique of the present disclosure. For the purpose of this, the attached drawings and the detailed explanation have been provided.

As a consequence, the constituent elements in the attached drawings and the detailed explanation include not only constituent elements essential for solving a problem to be solved but also constituent elements that are just essential for illustrating the technique but inessential for solving a problem to be solved. Although such inessential constituent elements appear in the attached drawings and the detailed explanation, the inessential constituent elements are not regarded as being essential.

Although the above-described embodiment has been applied to the so-called tablet terminal device, the electronic device according to the present disclosure is not limited to this embodiment but can be effectively applied to other various kinds of electronic devices.

In this manner, the above-described embodiment is adapted only to illustrate the technique according to the present disclosure, and therefore, it can be variously changed, replaced, added, and omitted within the scope of claims or its equivalent scope.

INDUSTRIAL APPLICABILITY

The present disclosure is applicable to the electronic device equipped with the detachable battery.

What is claimed is:

1. An electronic device comprising:
   a detachable battery from a casing;
   a battery loading section in which the battery is loaded, the battery loading section having a receiving surface that receives a battery to be mounted thereon and a peripheral wall that is formed at a peripheral edge of the receiving surface and faces side surfaces of the battery;
   a lock member disposed at a part of the peripheral wall and configured to shift between a lock position at which the loaded battery is locked to the battery loading section and an unlock position at which the lock is released;
   an unlock restricting member configured to shift between a restriction position at which the lock member at the lock position is restricted from being shifted to the unlock position and a non-restriction position at which the restriction is released; and
   a restricting member abutting portion provided at the outer surface of the battery and configured to abut against the unlock restricting member to shift the unlock restricting member to the non-restriction position when the battery being loaded into the battery loading section, in a case where the unlock restricting member is located at the restriction position even though no battery is loaded in the battery loading section.

2. The electronic device according to claim 1, further comprising:
   an urging member configured to urge the lock member toward the lock position; and
   a lock member abutting portion provided at the outer surface of the battery and configured to abut against the lock member located at the lock position to shift the lock member to the unlock position against the urging force of the urging member when the battery being loaded into the battery loading section.

3. The electronic device according to claim 2, wherein the lock member abutting portion abuts against the lock member located at the lock position to shift the lock member to the unlock position, after the restricting member abutting portion abuts against the unlock restricting member at the restriction position to shift the unlock restricting member to the non-restriction position, when the battery being loaded into the battery loading section, in a case where the unlock restricting member is located at the restriction position even though no battery is loaded in the battery loading section.

4. The electronic device according to claim 1, wherein a tip of the unlock restricting member forms into a horn projecting from the peripheral wall inward of the battery loading section, and a component of a pressing force generated by the abutment of the restricting member abutting portion against the horn exerts in a direction perpendicular to the peripheral wall.

5. The electronic device according to claim 1, further comprising:
   a first lock tab for operating the lock member in a longitudinal direction along the peripheral wall of the battery pack loading section;
   a second lock tab for operating the unlock restricting member in a lateral direction perpendicular to the longitudinal direction;
   a longitudinal groove, in which the first lock tab and the second lock tab are moved to the lock position and the unlock position in the longitudinal direction when the lock member is shifted between the lock position and the unlock position; and
   a lateral groove connected to the longitudinal groove, in which the second lock tab is moved from the non-restriction position that is referred to as the lock position to the restriction position in the lateral direction when the unlock restricting member is shifted between the restriction position and the non-restriction position.

* * * * *